United States Patent Office 3,121,004
Patented Feb. 11, 1964

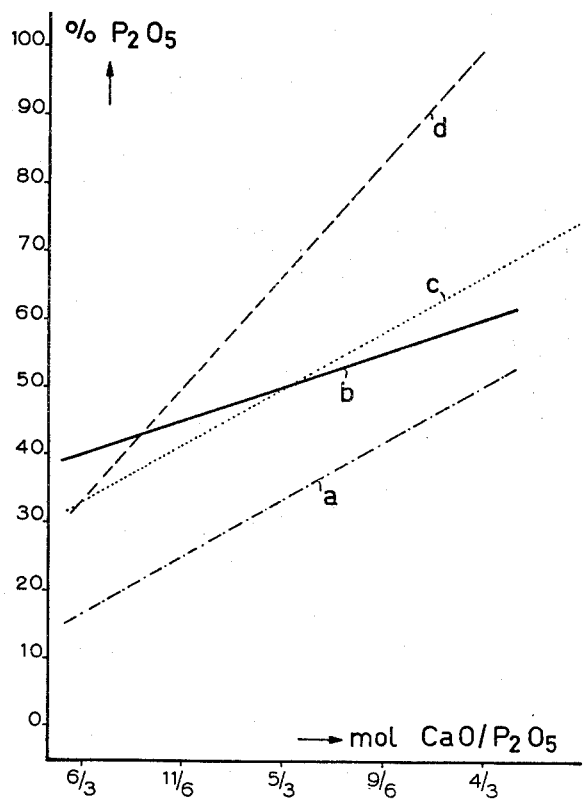

3,121,004
PROCESS OF PREPARING A COMPOUND FERTILIZER CONTAINING NITROGEN, CALCIUM AND PHOSPHATE, AND RESULTANT PRODUCT
Willem P. C. Verheul, Beek, Netherlands, assignor to Stamicarbon N.V., Heerlen, Netherlands
Filed May 29, 1961, Ser. No. 113,325
Claims priority, application Netherlands June 1, 1960
5 Claims. (Cl. 71—39)

It is a known fact that in decomposing phosphate rock with nitric acid, the resultant end product can be, depending on the amount of nitric acid used, either a fertilizer containing monocalcium phosphate or a fertilizer which substantially consists of dicalcium phosphate and, in addition, contains some water-soluble phosphate in the form of ammonium phosphate.

In the first case, the process (reaction) takes place according to the following equation, if the phosphate rock is assumed to be present as fluor apatite:

$$Ca_{10}(PO_4)_6F_2 + 12HNO_3 \rightarrow CaF_2 + 3Ca(H_2PO_4)_2 + 6Ca(NO_3)_2 \quad (1)$$

In the mixture thus obtained, all the $P_2O_5$ is present in the form of a water-soluble phosphate, which is considered especially favorable from the agricultural standpoint. However, there is a drawback in that due to the presence of the $Ca(NO_3)_2$, the fertilizer has a low softening temperature and is highly hygroscopic and, hence, tends to cake and is difficult to strew.

In the second case, it has been possible to obviate the drawback due to the presence of calcium nitrate by using so much $HNO_3$ in the decomposition reaction, that a mixture of free phosphoric acid and calcium nitrate is obtained, and by subsequently crystallizing out so much calcium nitrate from this decomposition liquor that, after neutralization, all the Ca $\cdot\cdot$ present precipitates in the form of $CaF_2$ and $CaHPO_4$, and the $P_2O_5$ residue, if any, is bound as ammonium phosphate.

Depending on the extent to which the calcium nitrate is separated out by cooling and, hence, depending on the molar $CaO/P_2O_5$ ratio in the decomposition liquor obtained after the $Ca(NO_3)_2.5$ aq. has been centrifuged off, a larger or smaller amount of water soluble $P_2O_5$ is obtained in the fertilizer. For example, if 40% of the Ca $\cdot\cdot$ present is to be separated out by cooling as $Ca(NO_3)_2$ .4 aq., then, the process is conducted in accordance with the following equation:

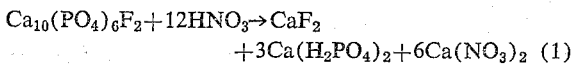

$$Ca_{10}(PO_4)_6F_2 + 20HNO_3 \longrightarrow$$
$$10Ca(NO_3)_2 + 6H_3PO_4 + 2HF \quad (2)$$
separation by cooling $4Ca(NO_3)_2$
leaves $6Ca(NO_3)_2 + 6H_3PO_4 + 2HF,$
with a molar $CaO/P_2O_5$ ratio=2

If a decomposition liquor of this analysis be partly neutralized in a continuous process at a pH of e.g. 2.5 and at a temperature of about 80° C. in the manner described in the British patent specification 692,251, and the neutralized mass is evaporated to a melt, which is granulated in the usual way, a fertilizer is obtained according to the equation:

$$6Ca(NO_3)_2 + 6H_3PO_4 + 2HF + 13NH_3$$
$$\rightarrow CaF_2\downarrow + 5CaHPO_4\downarrow + NH_4H_2PO_4 + 12NH_4NO_3 \quad (2a)$$

In the case of a fertilizer of this type, all the $P_2O_5$ is soluble in an ammonium citrate solution, but only ⅙ part thereof is soluble in water. If the water-soluble part of the phosphate present should have to be increased, then, more $Ca(NO_3)_2.4$ aq. has to be crystallized out and, for example, a decomposition liquor with a molar $CaO/P_2O_5$ ratio of, for example 1.66, would have to be partly neutralized according to the equation:

$$5Ca(NO_3)_2 + 6H_3PO_4 + 2HF + 12NH_3$$
$$\rightarrow CaF_2\downarrow + 4CaHPO_4\downarrow + 2NH_4H_2PO_4 + 10NH_4NO_3 \quad (2b)$$

which yields a fertilizer in which all the $P_2O_5$ is likewise ammonium citrate-soluble, while one third of it is water-soluble. If still more $Ca(NO_3)_2.4$ aq. is crystallized out, a decomposition liquor with a higher content of water-soluble $P_2O_5$ in the form of $NH_4$ phosphate can be obtained; a drawback is that by reason of such crystallization, more $Ca(NO_3)_2.4$ aq. per ton of $P_2O_5$ is obtained, which can be less attractive for marketing purposes, while higher contents of $NH_4H_2PO_4$ cause difficulties in carrying out the process.

On the other hand, addition of less $NH_3$ than the amounts given in Equations 2a and 2b, i.e. partial neutralization in a continuous process at a lower PH (for example 1), causes the formation of a greater or smaller amount—depending on the pH value—of the water-soluble $Ca(H_2PO_4)_2$. However, the $P_2O_5$ present in the form of $CaHPO_4$ then gives rise to the formation of a more viscous mass which is difficult to evaporate in the usual circulation evaporators.

According to the process described in the U.S. patent specification 2,948,602 it is possible to prepare a compound fertilizer containing nitrogen, calcium, and phosphate, with a considerable part, for example half of the phosphate soluble in water, by neutralizing with $NH_3$ the decomposition liquor—the molar $CaO/P_2O_5$ ratio in which has been reduced to a value $\leqslant 2$ by crystallizing out $Ca(NO_3)_2.4$ aq. or by adding $H_3PO_4$—at so high a pH value that there is precipitated a citrate-soluble fluor apatite in which the molar $CaO/P_2O_5$ ratio is about 3.3, as a result of which the amount of water-soluble phosphate not bound to calcium is increased. To prevent $NH_3$ losses during the evaporation, the pH is reduced after the neutralization to about 4 by the addition of a little acid, as a result of which the diammonium phosphate is changed into mono-ammonium phosphate.

The whole process takes place according to the following equations:

$$5Ca(NO_3)_2 + 6H_3PO_4 + 2HF + 16NH_3$$
$$\rightarrow [CaF_2 \cdot 4CaO \cdot 1.5P_2O_5]\downarrow + 3(NH_4)_2HPO_4 + 10NH_4NO_3 + \tfrac{1}{2}H_2O \quad (3)$$

$$[CaF_2 \cdot 4CaO \cdot 1.5P_2O_5]\downarrow + 3(NH_4)_2HPO_4 + 10NH_4NO_3 + 3HNO_3 \rightarrow [CaF_2 \cdot 4CaO \cdot 1.5P_2O_5]\downarrow + 3NH_4H_2PO_4 + 13NH_4NO_3 \quad (4)$$

This process has the drawback that in reaction (3) the pH must be kept very carefully between narrow limits (6.5–7), as otherwise, the citrate-solubility of the precipitated fluor apatite decreases rapidly. Moreover, in neutralizing at such a high pH value, not all of the $NH_3$ introduced is consumed; the unbound $NH_3$ has to be recovered from the vapor mixture, which is not an attractive operation.

It has now been found that a fertilizer containing nitrogen, calcium and phosphate, with a considerable percentage of the phosphate soluble in water, can be obtained in a simpler way by first partly neutralizing the decomposition liquor—in which the molar $CaO/P_2O_5$ ratio has been brought to a value $\leqslant 2$ in a usual way—in a continuous process at a pH in the range of 1.0–3.0 (measured in undiluted solution), and subsequently before further evaporation to a melt, adding acid to the reaction mass in an amount of 0.1–0.8 equivalent per mole of $P_2O_5$ present in the reaction mass. Surprisingly, the decomposition masses treated in this way maintained a low viscosity during evaporation. They could be evaporated without difficulty in complete contrast with the masses obtained when the $CaHPO_4$ is precipitated incompletely in the decomposition liquor, which is the case in a partial neutralization at a very low pH. Presumably, the following reactions occur in the process according to the present invention:

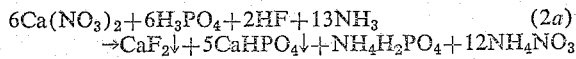
$$6Ca(NO_3)_2 + 6H_3PO_4 + 2HF + 13NH_3 \qquad (2a)$$
$$\rightarrow CaF_2\downarrow + 5CaHPO_4\downarrow + NH_4H_2PO_4 + 12NH_4NO_3$$

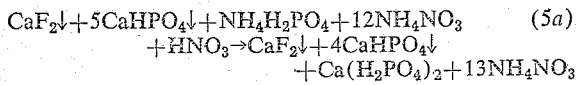
$$CaF_2\downarrow + 5CaHPO_4\downarrow + NH_4H_2PO_4 + 12NH_4NO_3 \qquad (5a)$$
$$+ HNO_3 \rightarrow CaF_2\downarrow + 4CaHPO_4\downarrow$$
$$+ Ca(H_2PO_4)_2 + 13NH_4NO_3$$

yielding a fertilizer in which all the $P_2O_5$ is soluble in an ammonium citrate solution, and 33% of the total $P_2O_5$ content is soluble in water.

When using a decomposition liquid with a low molar $CaO/P_2O_5$ ratio, e.g. 1.66, the water-soluble part of the phosphate present rises to 50%, as appears from the following equations:

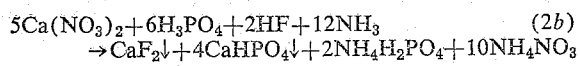
$$5Ca(NO_3)_2 + 6H_3PO_4 + 2HF + 12NH_3 \qquad (2b)$$
$$\rightarrow CaF_2\downarrow + 4CaHPO_4\downarrow + 2NH_4H_2PO_4 + 10NH_4NO_3$$

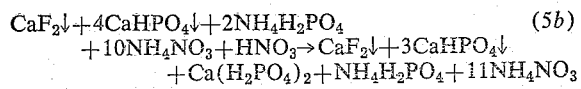
$$CaF_2\downarrow + 4CaHPO_4\downarrow + 2NH_4H_2PO_4 \qquad (5b)$$
$$+ 10NH_4NO_3 + HNO_3 \rightarrow CaF_2\downarrow + 3CaHPO_4\downarrow$$
$$+ Ca(H_2PO_4)_2 + NH_4H_2PO_4 + 11NH_4NO_3$$

In the process according to the above equations, 1 mole of $HNO_3$ per 3 moles of $P_2O_5$ was added after the treatment with $NH_3$ and before further evaporation. However, less or even much more $HNO_3$ can be added, for example 0.3–2.4 moles/3 moles of $P_2O_5$; in the latter case, larger or smaller amounts of dicalcium phosphate and mono-ammonium phosphate change into monocalcium phosphate and ammonium nitrate and, consequently, more phosphate becomes water-soluble. However, the drawback of adding too much $HNO_3$ is that the pH of the fertilizer finally obtained will be very low and the hygroscopicity of the fertilizer will increase.

The annexed figure is a graph which shows the relationship between the molar $CaO/P_2O_5$ ratio in the decomposition liquor to be partly neutralized and the percentage of water-soluble phosphate with respect to the total phosphate present.

Curve $a$ shows this relationship for a fertilizer containing mainly dicalcium phosphate and prepared according to the reaction scheme represented in the Equations 2a and 2b. Curve $b$ shows this relationship for the "citrate-soluble" apatite fertilizer prepared according to the Equations 3 and 4, while curves $c$ and $d$ show the relationship for the process according to the invention.

Curve $c$ shows the relationship in the case of the process carried out according to the reaction 5a or 5b, while in the case of curve $d$, so much acid—nitric acid or another strong acid, e.g. a strong inorganic acid such as $H_2SO_4$—was added after the treatment with $NH_3$ that all of the mono-ammonium phosphate present combined with equivalent amounts of dicalcium phosphate to give monocalcium phosphate and $NH_4NO_3$. Theoretically, a fertilizer can thus be obtained in which the $P_2O_5$ is 100% soluble in water.

*Example*

A 1000 kg. mixture of Kola and Kouribgha phosphate (50.6% CaO, 37.7% $P_2O_5$, 3.5% F, 1.2% $CO_2$) is dissolved with 2650 kg. of 53% $HNO_3$ at 80° C., which yields a decomposition liquor with a molar N/CaO ratio of 2.47 and a molar $CaO/P_2O_5$ ratio of 3.40.

1160 kg. of $Ca(NO_3)_2.4$ aq. is crystallized out by cooling, and is separated by centrifuging from the residual decomposition liquor, in which the molar N/CaO ratio now amounts to 3.02 and the molar $CaO/P_2O_5$ ratio is 1.56. This acidic mother liquor (2385 kg.) is continuously brought together with an $NH_3$ stream in a reaction mixture already treated with $NH_3$. During the partial neutralization, the pH remains at 2.4, 240 kg. of $NH_3$ is consumed. During this process 300 kg. of water vapor escapes.

The resultant reaction mass is subsequently acidified with 125 kg. of 53% $HNO_3$, hence, 0.4 mole of $HNO_3$ per mole $P_2O_5$ present in the reaction mass. The mass is evaporated to a melt, during which process 510 kg. of water evaporates, and the melt is granulated and dried, when another 75 kg. of water vapor escapes.

The output is 1865 kg. of end product with a $P_2O_5$ content of 20.20%, of which 99.0% is soluble in an ammonium citrate solution and 50% is soluble in water. The N content is 20.0%, of which 10.6% is $NH_3$—N and 9.4% is $NO_3$—N.

I claim:

1. Process of preparing from calcium phosphate rock a compound fertilizer containing nitrogen, calcium and phosphate, wherein the phosphate is substantially completely soluble in ammonium citrate and soluble in water to a substantial extent, comprising the following steps: dissolving the said phosphate rock with nitric acid, thereby obtaining an acid decomposition liquor; adjusting the $CaO/P_2O_5$ ratio of said acid liquor to a value between 1⅓ and 2; partly neutralizing in a continuous operation the adjusted acid liquor with $NH_3$ to a pH in the range of 1.0–3.0; adding to the partly neutralized reaction mass a strong inorganic acid in an amount of 0.1–0.8 equivalent per mole of $P_2O_5$ present in the reaction mass; evaporating the so-treated mass to a melt; drying said melt, and recovering the dried melt, which forms the above-mentioned compound fertilizer.

2. Process according to claim 1, wherein the acid added to the partly neutralized reaction mass is nitric acid.

3. Process according to claim 1, wherein the phosphate in the compound fertilizer is about 50% soluble in water.

4. Process according to claim 1, wherein the melt is granulated before drying.

5. A granular fertilizer containing nitrogen, calcium and phosphate, said fertilizer produced from calcium phosphate rock by a process comprising the steps of: dissolving the phosphate rock with nitric acid to produce an acid decomposition liquor; adjusting the molar $CaO/P_2O_5$ ratio of the liquor, to a value between 1⅓ and 2; continuously partly neutralizing the thus adjusted liquor to a pH within the range of 1.0 to 3.0 by introducing streams of the adjusted liquor and $NH_3$ into a contacting vessel; adding to the partly neutralized reaction mass a strong inorganic acid, in an amount of 0.1 to 0.8 equivalent per mole of $P_2O_5$ present in the reaction mass; evaporating the so-treated reaction mass to obtain a melt; thereafter drying said melt and recovering the dried melt which forms the fertilizer and which contains phosphate which is substantially completely soluble in ammonium citrate and at least one-third soluble in water.

References Cited in the file of this patent

UNITED STATES PATENTS

| | | |
|---|---|---|
| 2,936,228 | Van den Berg | May 10, 1960 |
| 2,948,602 | Revallier et al. | Aug. 9, 1960 |

FOREIGN PATENTS

| | | |
|---|---|---|
| 430,380 | Great Britain | June 18, 1935 |
| 692,251 | Great Britain | June 3, 1953 |
| 692,252 | Great Britain | June 3, 1953 |
| 692,253 | Great Britain | June 3, 1953 |

UNITED STATES PATENT OFFICE
CERTIFICATE OF CORRECTION

Patent No. 3,121,004 February 11, 1964

Willem P. C. Verheul

It is hereby certified that error appears in the above numbered patent requiring correction and that the said Letters Patent should read as corrected below.

Column 1, line 44, for "$Ca(NO_3)_2.5$" read -- $Ca(NO_3)_2.4$ --; column 2, line 4, in the formula, for "CaF" read -- $CaF_2$ --; line 18, for "PH" read -- pH --; column 3, line 5, for "liquid" read -- liquor --.

Signed and sealed this 23rd day of June 1964.

(SEAL)
Attest:

ERNEST W. SWIDER
Attesting Officer

EDWARD J. BRENNER
Commissioner of Patents